US010729165B2

(12) United States Patent
Mendes

(10) Patent No.: US 10,729,165 B2
(45) Date of Patent: Aug. 4, 2020

(54) JUICE EXTRACTION MACHINE

(71) Applicant: Carlos Neto Mendes, Araraquara-SP (BR)

(72) Inventor: Carlos Neto Mendes, Araraquara-SP (BR)

( * ) Notice: Subject to any disclaimer, the term of this patent is extended or adjusted under 35 U.S.C. 154(b) by 792 days.

(21) Appl. No.: 15/305,812

(22) PCT Filed: Apr. 6, 2015

(86) PCT No.: PCT/IB2015/052482
§ 371 (c)(1),
(2) Date: Oct. 21, 2016

(87) PCT Pub. No.: WO2015/162512
PCT Pub. Date: Oct. 29, 2015

(65) Prior Publication Data

US 2017/0042210 A1 Feb. 16, 2017

(30) Foreign Application Priority Data

Apr. 22, 2014 (BR) .......................... 1020140095942

(51) Int. Cl.
*A47J 19/02* (2006.01)
*A23N 1/00* (2006.01)
*A23N 1/02* (2006.01)

(52) U.S. Cl.
CPC ................. *A23N 1/02* (2013.01); *A23N 1/00* (2013.01)

(58) Field of Classification Search
CPC ................................. A23N 1/003; A23N 1/02
See application file for complete search history.

(56) References Cited

U.S. PATENT DOCUMENTS 2,723,618 A 11/1955 Matthews et al.
3,086,455 A 4/1963 Belk
(Continued)

FOREIGN PATENT DOCUMENTS

BR 8904555 A 4/1990
BR 9502244 A 11/1995
(Continued)

OTHER PUBLICATIONS

BR9502244A_English_Abstract.
(Continued)

*Primary Examiner* — Dana Ross
*Assistant Examiner* — Lawrence H Samuels
(74) *Attorney, Agent, or Firm* — Ferdinand M. Romano; Accel IP Law

(57) ABSTRACT

Improvements to a juice extraction machine, particularly a commercial-scale fruit juice extraction machine that is extremely light and compact for very easy handling and transportation, which is noteworthy for its unusual construction configuration that includes, among other items, a swing lidded waste-bin on its front whose walls are close to the peeler cups when closed, allowing easy removal of wastes such as pith, pulp and peel when open. The invention comprises a fruit-rack sub-set with a curved concave cross-section whose movement is synchronized with the axle that powers the mobile peeler, such fruit-rack being attached to the mobile peeler sub-set through slots and with the machine including a cross-spring attached at the bottom of the feeder/dispenser pipe, with such cross-spring having a means of activation located on the fruit-rack sub-set; the improved machine comprises a swing-lidded waste-bin on its front part, with such swing-lidded waste-bin having substantially semi-circular sides close to the mobile and fixed peelers and with the mobile peeler connected to a
(Continued)

gear-motor sub-set and the fixed peeler concatenate with the filter and piston sub-set assembled in the fixed peeler.

22 Claims, 20 Drawing Sheets

(56) References Cited

U.S. PATENT DOCUMENTS

| | | | | |
|---|---|---|---|---|
| 4,154,163 | A * | 5/1979 | Niemann | A23N 1/003 100/108 |
| 4,309,944 | A * | 1/1982 | Frost, Jr. | A23N 1/003 100/104 |
| 4,776,480 | A * | 10/1988 | Triadu | B65F 1/141 220/478 |
| 4,905,586 | A * | 3/1990 | Anderson | A23N 1/003 99/510 |
| 5,199,348 | A * | 4/1993 | Cimenti | A23N 1/003 100/125 |
| 5,249,516 | A * | 10/1993 | Pastor | A23N 1/003 99/495 |
| 5,339,729 | A * | 8/1994 | Anderson | A23N 1/00 100/213 |
| 5,361,978 | A * | 11/1994 | Monroe | B65F 1/06 220/908 |
| 5,483,870 | A * | 1/1996 | Anderson | A23N 1/003 100/108 |
| 5,655,441 | A * | 8/1997 | Mendes | A23N 1/003 100/108 |
| 5,720,218 | A | 2/1998 | Mendes | |
| 5,720,219 | A | 2/1998 | Mendes | |
| 5,802,964 | A * | 9/1998 | Mendes | A23N 1/02 100/108 |
| 5,957,043 | A * | 9/1999 | Font | A23N 1/003 221/258 |
| 5,984,134 | A * | 11/1999 | Mario | B65F 1/06 220/495.11 |
| 7,000,534 | B1 * | 2/2006 | Mendes | A23N 1/003 100/108 |
| 7,086,328 | B1 | 8/2006 | Mendes | |
| 7,228,796 | B2 | 6/2007 | Neto | |
| 7,628,108 | B2 | 12/2009 | Neto | |
| 7,717,032 | B2 | 5/2010 | Neto | |
| 8,047,130 | B2 | 11/2011 | Neto | |
| 8,141,481 | B2 * | 3/2012 | Forbes | B65F 1/0006 100/131 |
| 8,261,659 | B2 | 9/2012 | Neto | |
| 9,675,101 | B2 * | 6/2017 | Conti | A23N 1/02 |
| 2005/0028690 | A1 | 2/2005 | Neto | |
| 2008/0250942 | A1 * | 10/2008 | Neto | A23N 1/003 99/510 |
| 2009/0242567 | A1 * | 10/2009 | Forbes | B65F 1/0006 220/495.08 |
| 2009/0301318 | A1 * | 12/2009 | Torrisi | A23N 1/003 99/503 |
| 2014/0261019 | A1 * | 9/2014 | Conti | A23N 1/02 99/513 |
| 2015/0305540 | A1 * | 10/2015 | Stolk | A47J 19/02 100/37 |
| 2015/0342245 | A1 * | 12/2015 | Hensel | A47J 19/027 99/509 |

FOREIGN PATENT DOCUMENTS

| | | | |
|---|---|---|---|
| BR | 7502994 | U | 7/1996 |
| BR | 7501779 | U | 12/1996 |
| BR | 9600402 | A | 3/1998 |
| BR | PI0717050 | A2 | 10/2013 |
| WO | 2008035388 | A1 | 3/2008 |

OTHER PUBLICATIONS

BR7501779U_English_Abstract.

BRPI0717050A2_English_Abstract.

International Search Report and Written Opinion dated Oct. 29, 2015, for PCT/IB2015/052482.

International Preliminary Report on Patentability dated Oct. 25, 2016, for PCT/IB2015/052482.

EP Search Report dated Dec. 21, 2017, for corresponding EP patent application No. 15782960.7.

* cited by examiner

JUICE EXTRACTION MACHINE

RELATED APPLICATION

This application is a national phase entry under 35 USC 371 of International Patent Application No.: PCT/IB2015/052482 filed on 6 Apr. 2015, which claims priority from Brazilian Application No. BR1020140095942 filed on 22 Apr. 2014, the disclosures of which are incorporated in their entirety by reference herein.

BRIEF INTRODUCTION

This application requests a Patent of Invention for IMPROVEMENTS TO A JUICE EXTRACTION MACHINE, particularly an extremely compact commercial-scale fruit juice extraction machine that is extremely easy to handle and transport, being noteworthy for the unusual configuration of its construction that, among other items, is fitted with a swing-lidded waste-bin at the front whose side walls are close to the peeler cups when completely closed, allowing easy waste pith, pulp and peel removal when open. This invention is also noteworthy for a fruit-rack mounted on and connected to the mobile peeler that holds the fruit during the second stage (when the fruit is on the mobile peeler) with this rack being smooth-surfaced and slightly curved (with a broad radius), serving as a waiting stage before the fruit falls onto the peelers, without damaging the fruit and ensuring that it slides easily, in addition to significantly enhancing the efficiency of the machine, which is small compared to others, although highly productive.

FIELD OF APPLICATION

Fruit juice extraction in the commercial sector.

STATE OF THE ART

Since 1995, the inventor has devoted time and attention to the development of fruit juice extractors, filing the first patent application N° PI9502244-9 for a commercial-scale machine with the following characteristics: a machine developed for processing citrus fruit in general with no manual contact, comprised of a tubular chassis attached to an extraction compartment in which is installed a geared motor rotating a crankshaft that in turn axially revolves one peeler cup against another peeler cup in order to trap the fruit released by a trigger located at the outlet of a fruit tray, with one of the above-mentioned peeler cups having a central shaft and the other a juice extraction perforation pipe, whereby all these solid wastes are discharged into a waste-bin while the liquid runs through a filter, flowing sequentially through a pipe in a horizontal "S" shape.

Within the line of research pursued by the inventor, the technology was improved and an application was filed under N° MU7501780-6 for the machine feeder system, describing the steady supply fed into the machine in a synchronized manner through a feeder arm positioned across the feeder outlet, preventing the fruit from moving forward, with this arm lifting as the mobile peeler cup moves towards the static (fixed) peeler cup and allowing a fruit to fall from the container, and so on successively, whereby a fruit falls directly on to the peelers in each cycle.

Progressing with the state of the art, this inventor filed an application under N° MU7502884-4, whose purpose was to improve the feeder system even more through introducing a fruit stirrer on the top tray and a new dispensing device fitted with a spiral spring placed across the feeder outlet, allowing only one fruit to fall each time.

Analyzing the indicated state of the art for the line of progression developed by this inventor, the first issue to be addressed with regard to PI9502244-9 is the shape and placement of the waste-bin, as with the previous technique it is located very far away from where the extraction occurs. Thus, bearing in mind that the fruit peel, pith and pulp are expelled at random, in addition to the possibility that a piece of fruit may "burst", wastes stick to the sides of the machine under these conditions until reaching the waste-bin. Consequently, in order to remove the wastes from the waste-bin, it is necessary to take it out of the machine. It is even harder to clean the walls surrounding the peelers, especially the walls between such peelers and this waste-bin.

The second issue to be addressed consists of the so-called second stage of the fruit, which is when it is positioned over the mobile peeler, as this consists of blades and its outer shape does not allow the fruit to slide easily during linear movement. In this context, another technical issue noted by the inventor relates to the fruit wastes, which are thrown towards the top part of the machine, as the peeler is hollow.

THIS INVENTION

In order to resolve the issue of the distance of the waste-bin, the inventor designed a surrounding swing-lidded waste-bin that addresses not only the distance factor but also its manner of construction. In this invention, the walls of the surrounding swing-lidded waste-bin are close to the peelers which also means that, in addition to helping resolve the wastes removal problem, the machine is very compact, although highly productive. On the other hand, the side walls of the above-mentioned surrounding swing-lidded waste-bin are semicircular, whereby it can be rotated, thus allowing very easy waste removal.

With regard to the second aspect addressed, meaning the fruit slipping onto the mobile peeler, the inventor introduced a fruit-rack positioned on the outer top side of the mobile peeler, whose movements are linked thereto. This means that the fruit lies on a more suitable smooth surface, particularly as its curved shape has a radius far larger than that of the fruit itself, constituting a tubular structure that releases the fruit. This fruit-rack also serves to deflect wastes, not allowing them to fly upwards and thus keeping the top part of the machine clean.

In other words, when compared to the mentioned documents constituting the state of the art, the most relevant innovations in this invention are related to the parts of the machine arrayed after the dispenser or feeder device, considering the characteristic operating cycle of this type of juice extractor.

With this new machine, according to the invention, it may be said that the fruit runs through three stages, all synchronized by the mobile peeler movements. In the first stage, the fruit lies on a cross spring in the feeder; in the second stage, the fruit falls onto the fruit-rack, released by contact between the spring release devices resulting from the linear movement of the mobile peeler towards the fixed peeler, being held above the mobile peeler by the cross-spring; in the third stage, the fruit falls onto the fixed and mobile peelers, resulting in the fruit being peeled and the juice being extracted.

In more technical terms, this invention places a spiral cross-spring between the feeder pipe and the fruit-rack sub-set that initially holds the fruit in the vertical feeder or dispenser (first stage), with this spring activated through devices inserted in the above-mentioned fruit-rack sub-set that are triggered by the same axle that rotates the mobile peeler, whereby the fruit waiting on the rounded fruit-rack constitutes the second stage, whereby such fruit will be released on to the peeler sub-set only when the fruit movement component on the fruit-rack sub-set touches such fruit during linear movement, allowing it to fall between the peelers for the third stage, which is the act of peeling the fruit and extracting the juice simultaneously. In other words, in an almost simultaneous operation, the spiral cross spring is touched by the spring activators, releasing the fruit lined up in the feeder pipe, which then falls onto the above-mentioned fruit-rack.

Thus, the fruit running through the dispenser falls onto the top part of the mobile peeler and then on to the peeler during the next cycle, when the juice is extracted. Assuming that the dispenser or feeder pipe is full, there will be one fruit at each of the stages in each cycle.

Advantages of the Invention

Among other advantages that are clear from the preceding description, the advantages rated as relevant to this invention may be listed as follows:

More efficiently synchronized fruit feed as the fruit slips more smoothly over the fruit-rack during the second feeder stage;

Less damage to the fruit, due to the shape and polished surface of the fruit-rack;

Keeps the inside of the machine cleaner;

Easier and more complete cleaning and removal of pith, pulp and peel;

Machine with a lighter, less complex and more compact structure, requiring fewer parts with lower manufacturing costs.

DESCRIPTION OF THE DRAWINGS

The details of the construction and operation of the invention are set forth below, with the appended drawings disclosing a preferred construction for the machine, which may be altered provided that the scope of the invention is maintained. The Figures are.

Figure 6:
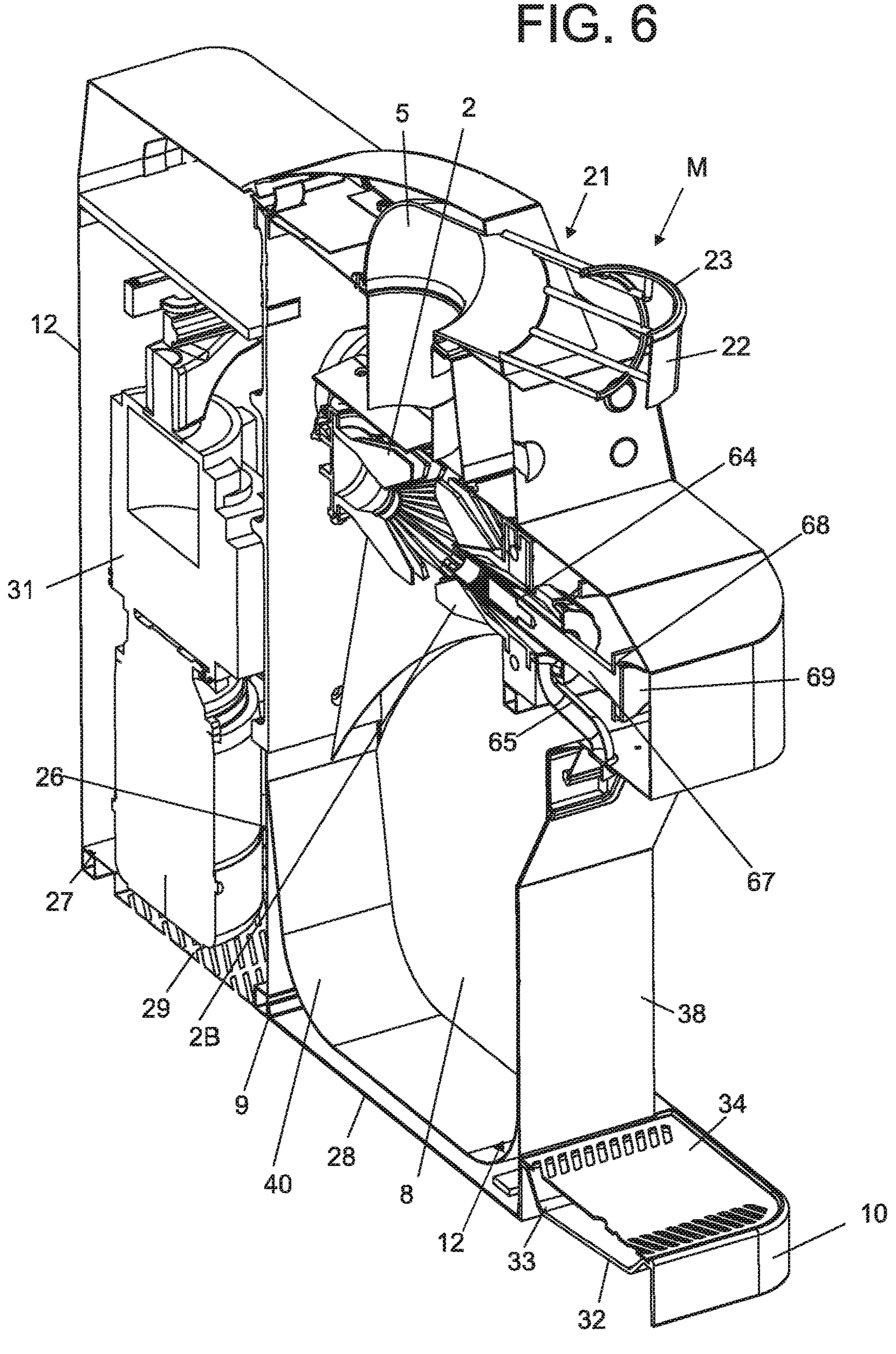
FIG. 6: Longitudinal cross-section perspective view of the machine.
Figure 7:
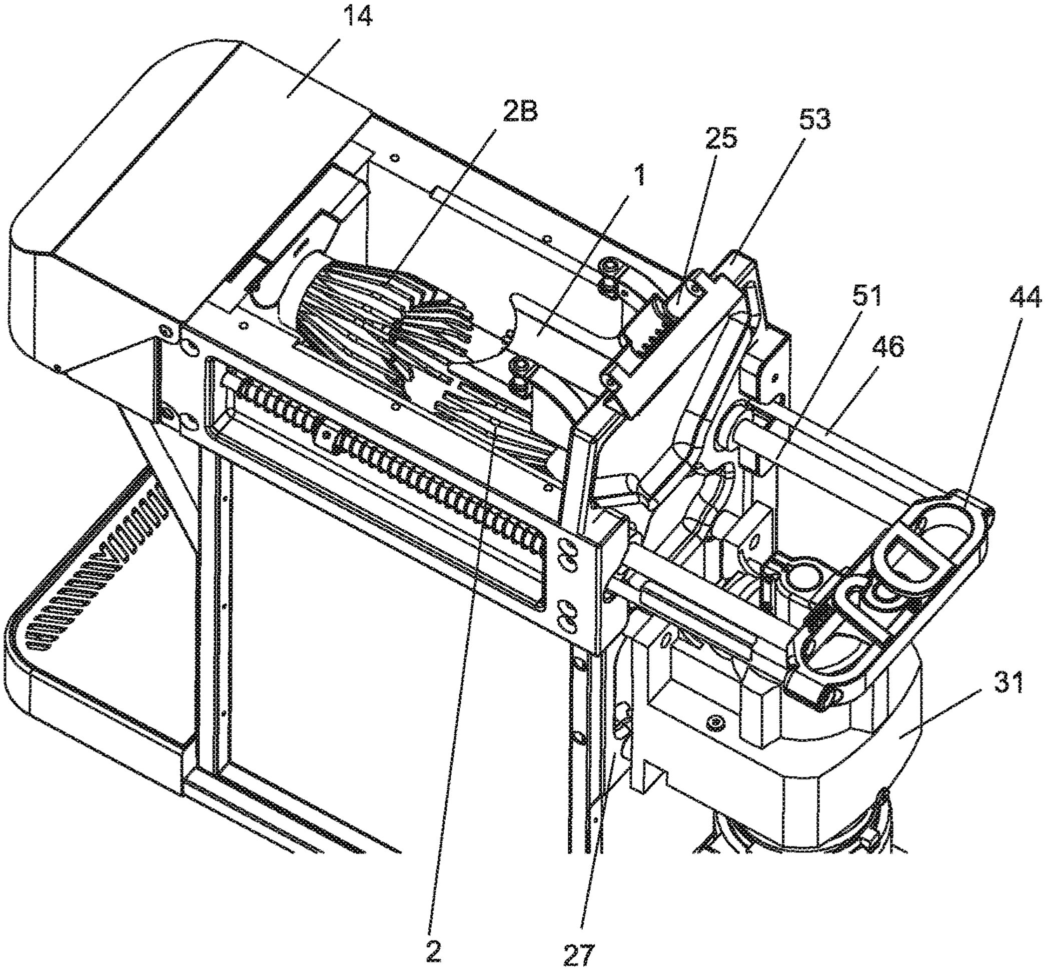
FIG. 7: Top perspective view of the machine without the cowling, showing the peelers moving towards each other.
Figure 8:
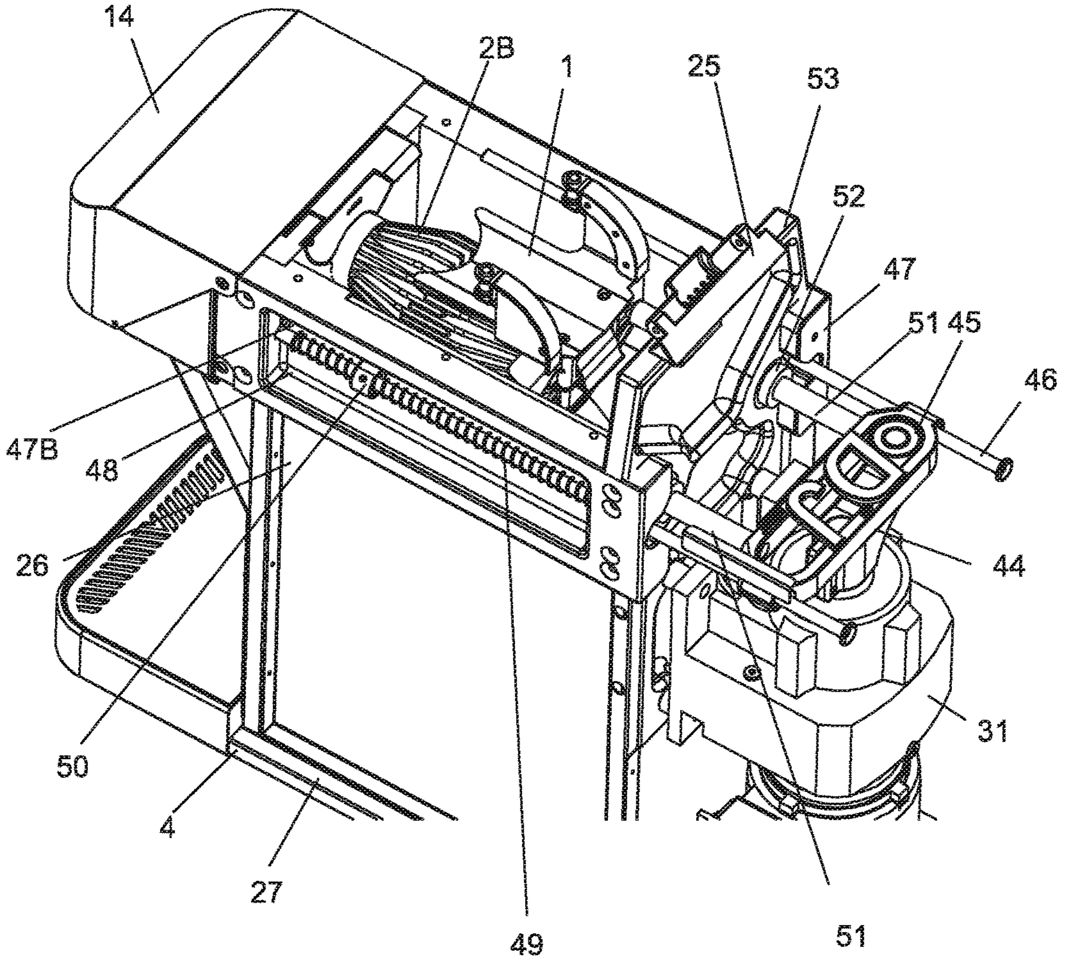
FIG. 8: Top perspective view of the machine without the cowling, showing the peelers starting to engage with each other.
Figure 9:
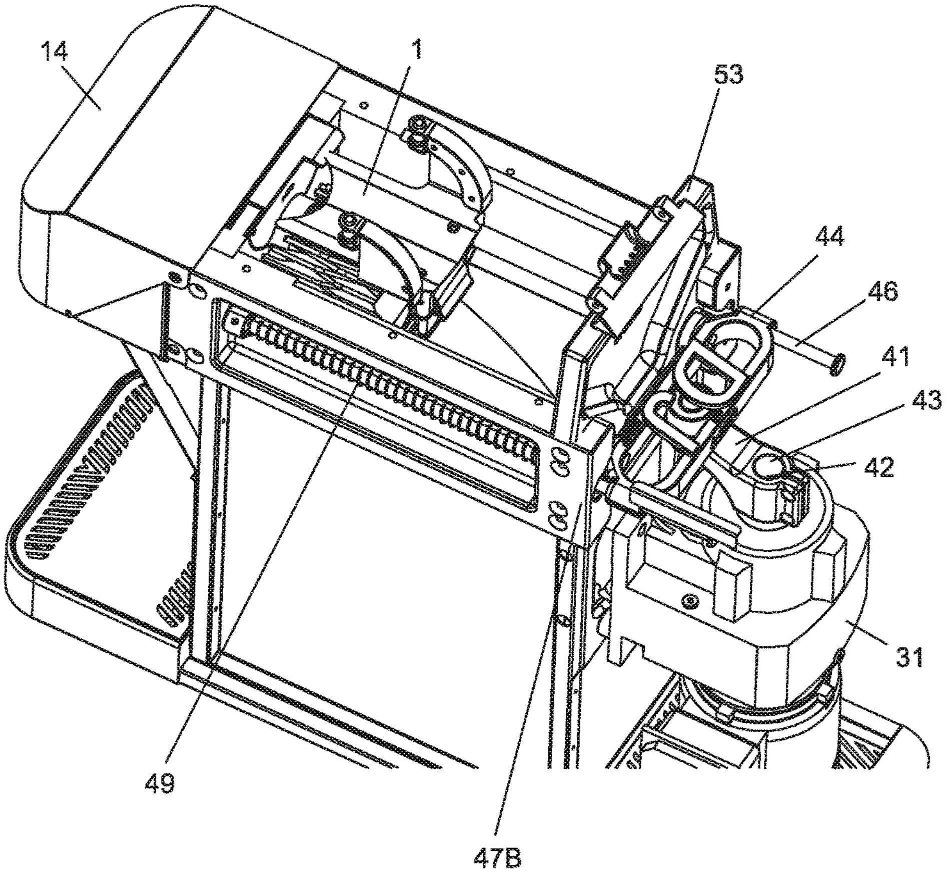
FIG. 9: Top perspective view of the machine without the cowling, showing the peelers fully engaged with each other.
Figure 10:
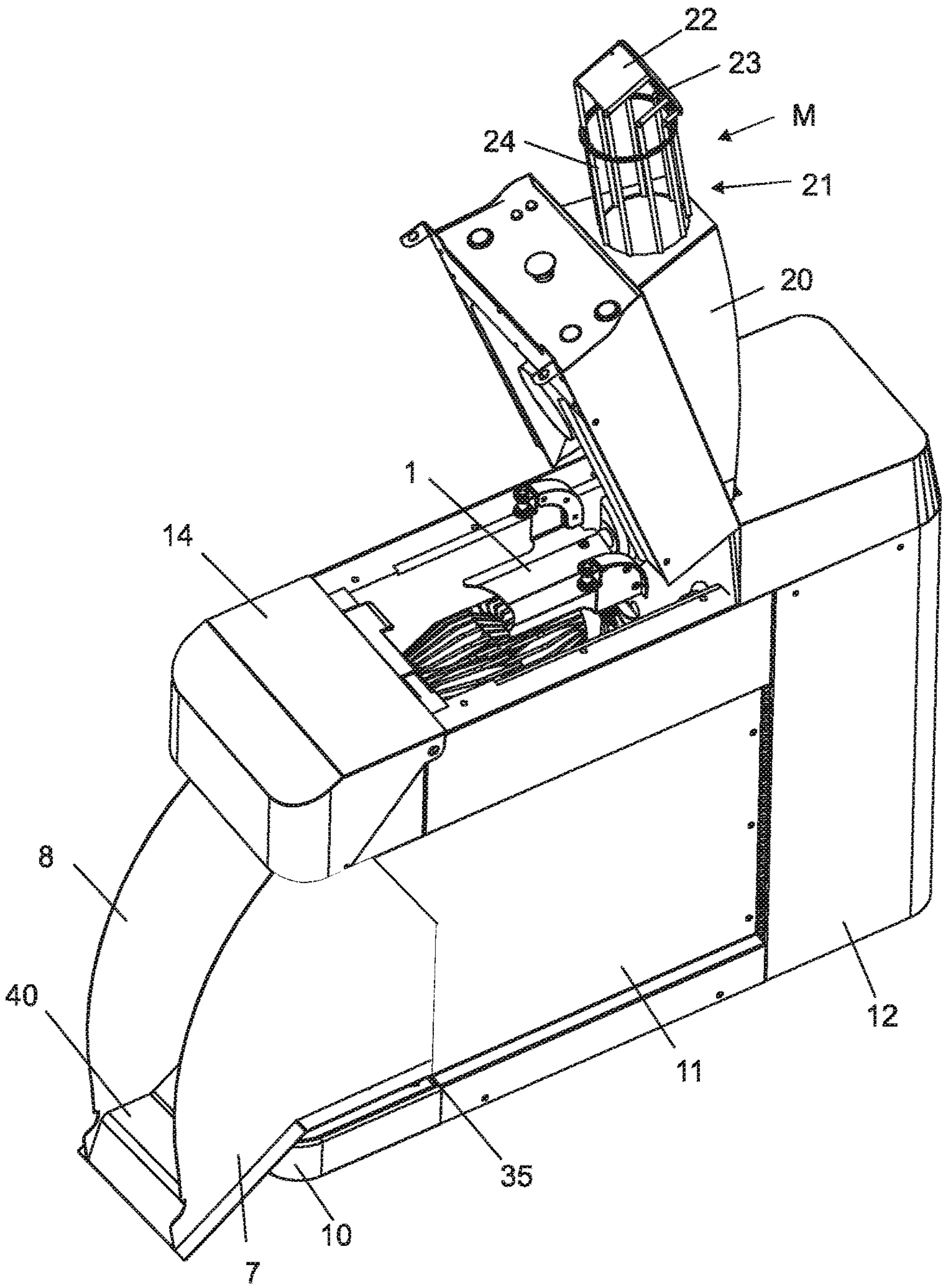
FIG. 10: Perspective view of the machine with the fruit-rack sub-set in the open position.
Figure 18:
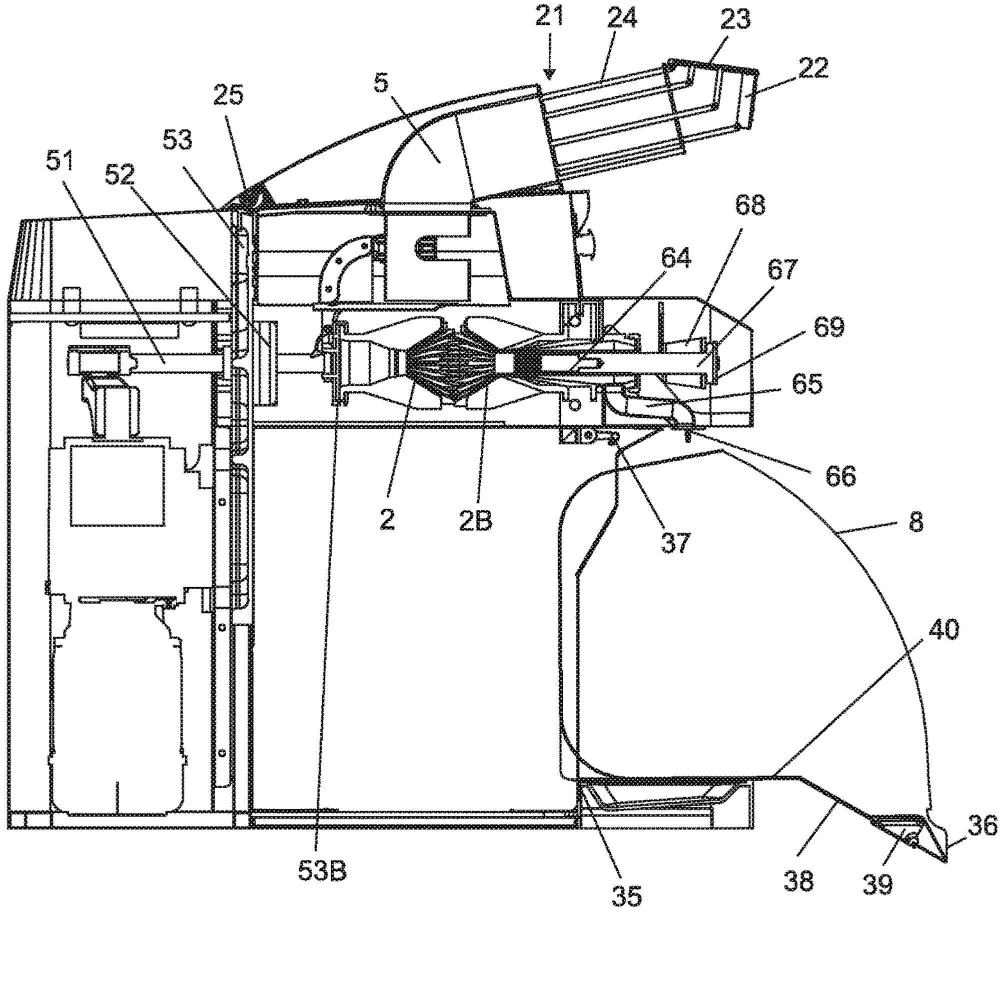
FIG. 18: Front view of the machine with partial cross-sections near the dispenser/feeder sub-set, fruit-rack and swing-lidded waste-bin in the open position.

The IMPROVEMENTS TO A JUICE EXTRACTION MACHINE addressed by this application for a Patent of Invention are improvements to a juice extraction machine (M), comprising a fruit-rack sub-set (1) with a curved cross-section whose movement is synchronized with the mobile peeler rotating axle (2), with such fruit-rack (1) being attached to the mobile peeler sub-set (2) through slots (3), with the machine including a cross-spring (4) attached at the bottom of the feeder/dispenser pipe (5), with such cross-spring (4) having a means of activation (51) located on the fruit-rack sub-set (1); the improved machine (M) comprises a swing-lidded waste-bin (7) in front, with such swing-lidded waste-bin (7) having substantially semi-circular sides (8) close to the mobile (2) and fixed peelers (2B) that are aligned with each other, with the latter being concatenate with the filter and piston sub-set (67) mounted inside the fixed peeler (2B) (FIGS. 6, 7 and 18).

Figure 1:
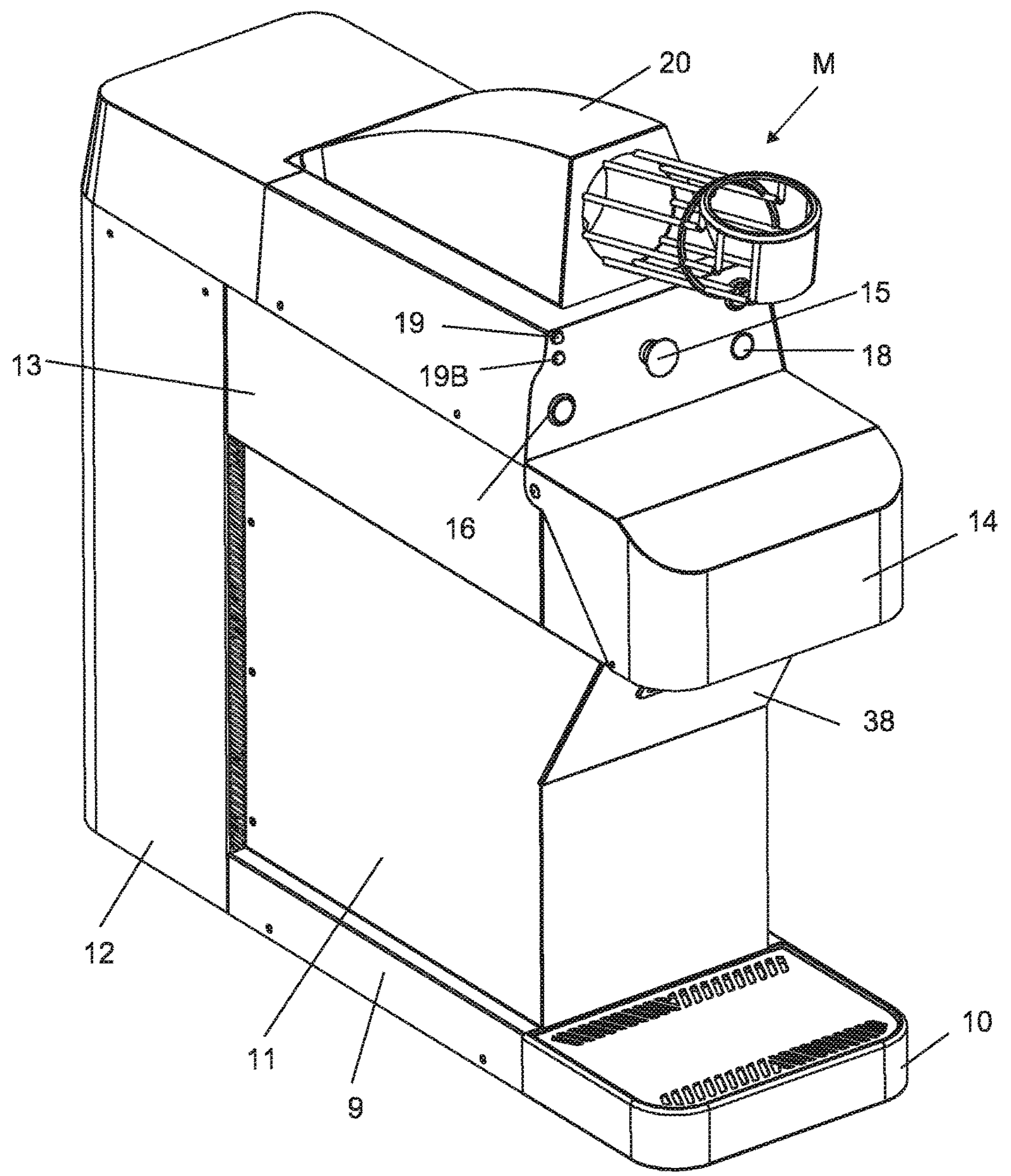
FIG. 1: Front perspective view of the machine.
Figure 2:
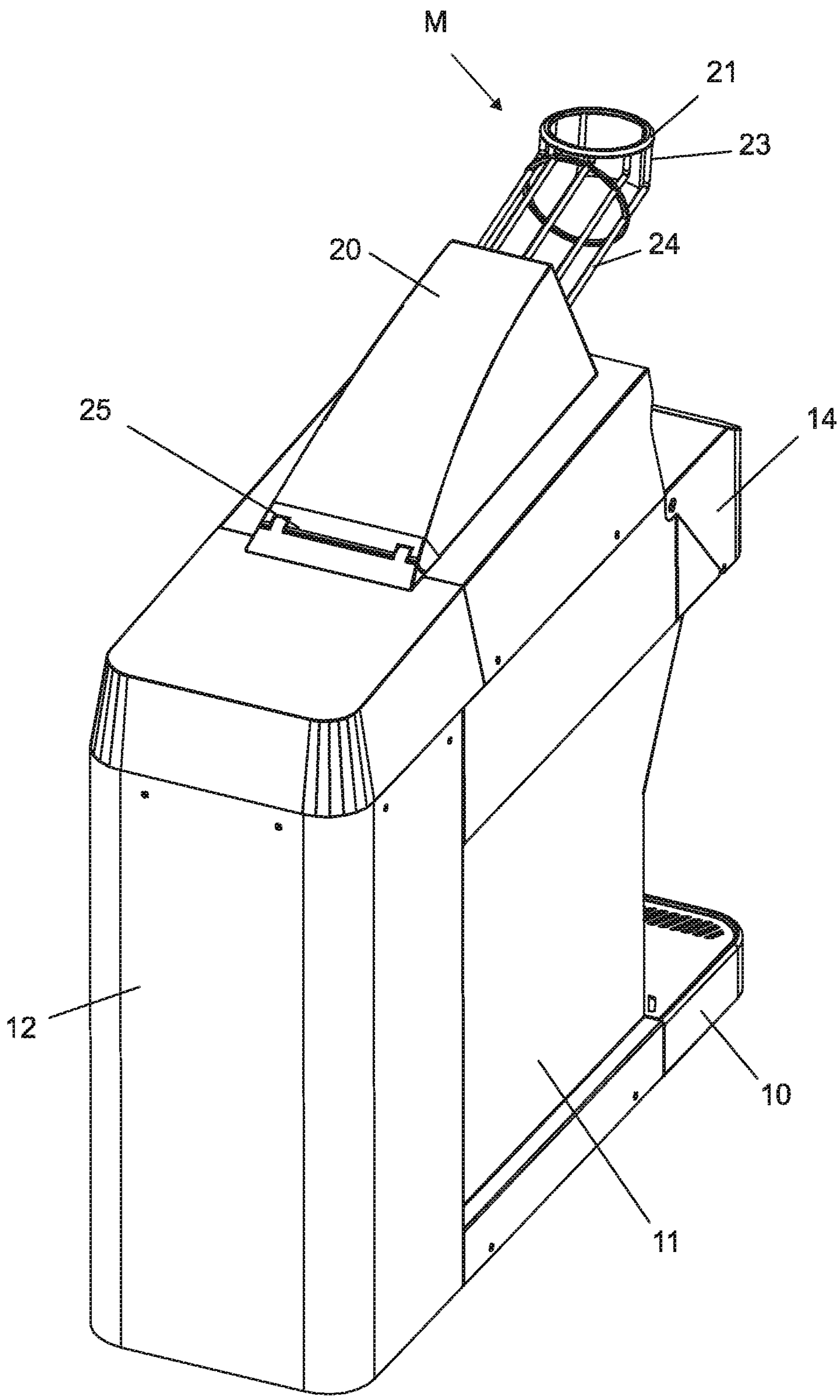
FIG. 2: Rear perspective view of the machine.
Figure 3:
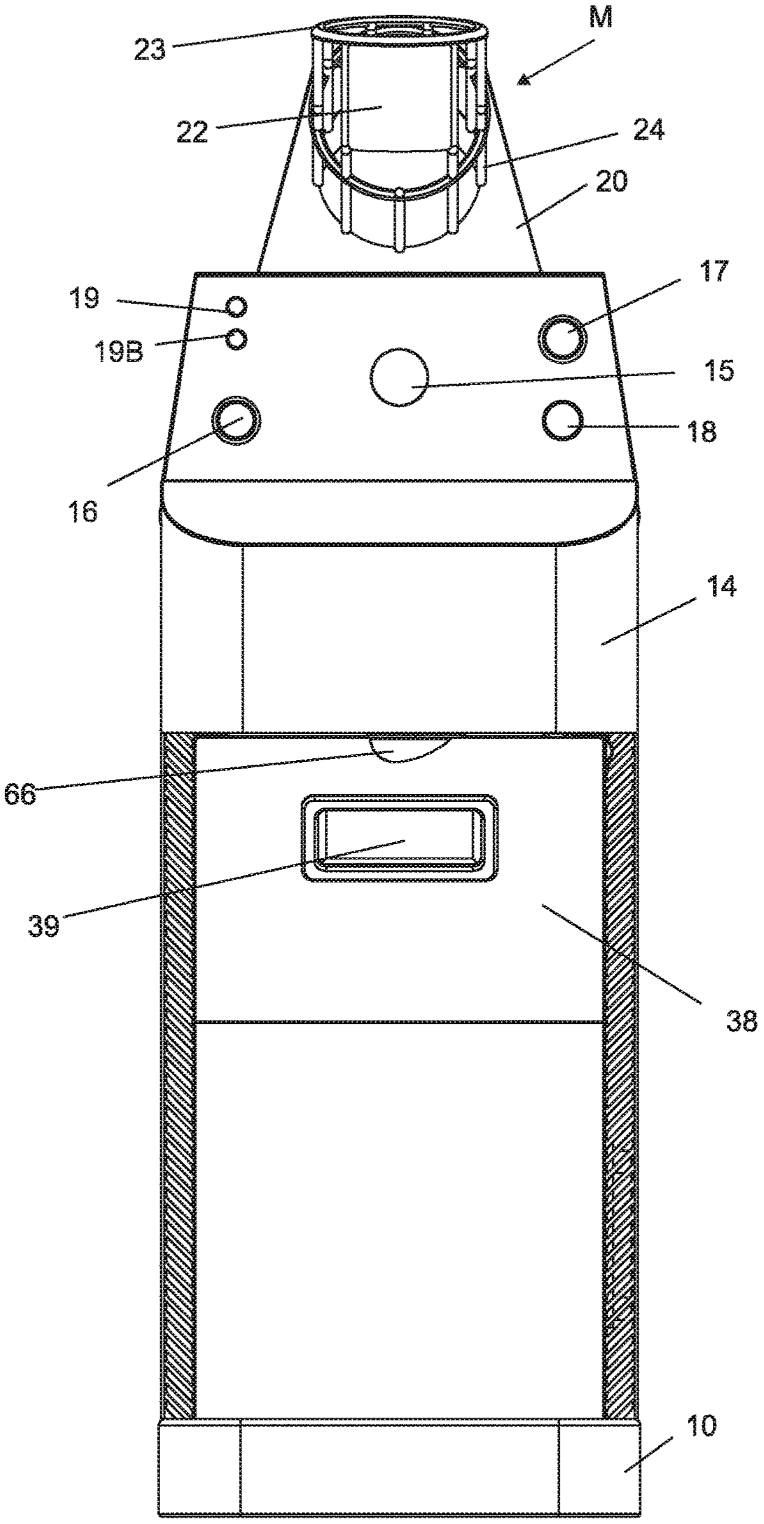
FIG. 3: Front view of the machine.
Figure 4:
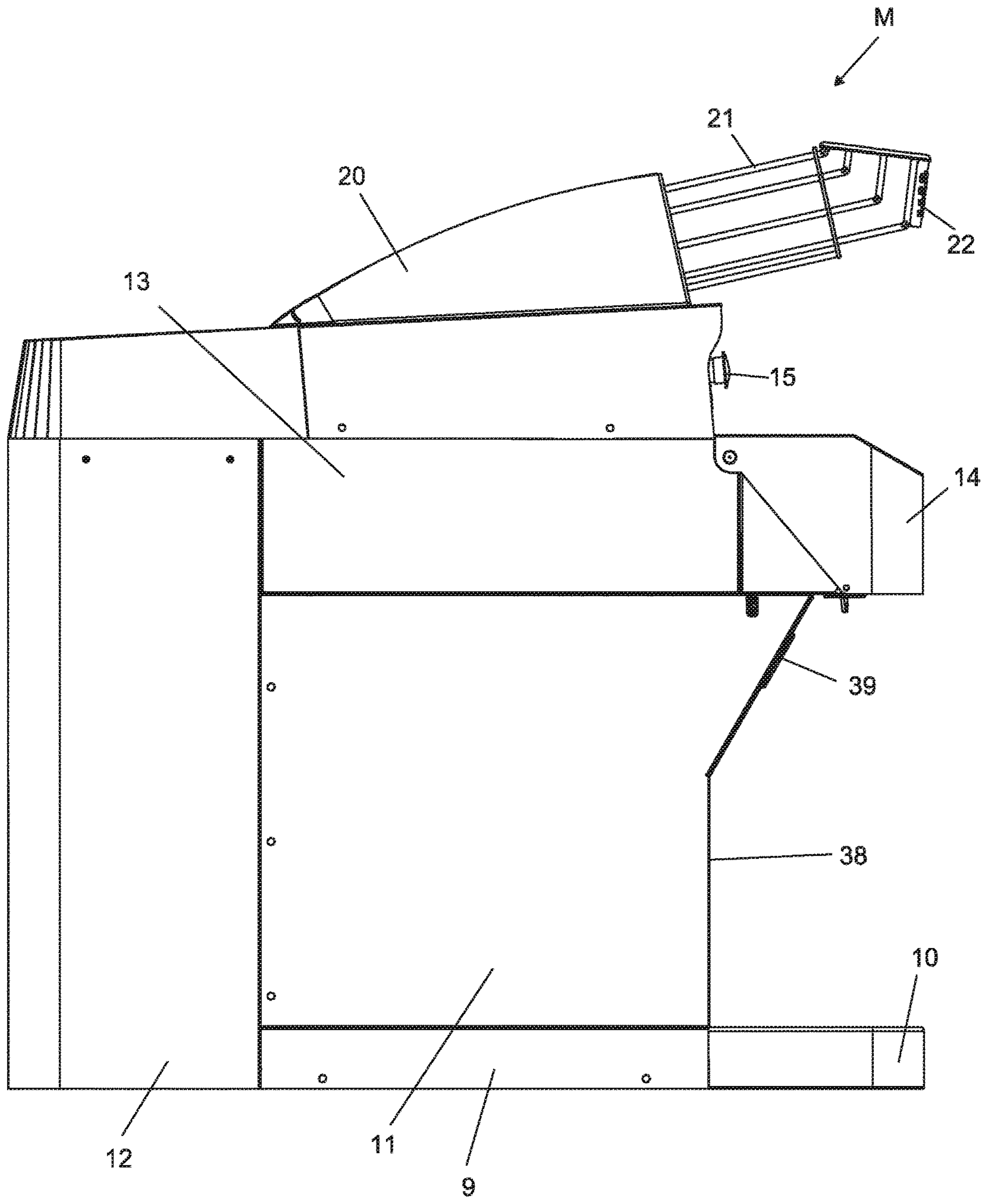
FIG. 4: Side view of the machine.
Figure 5:
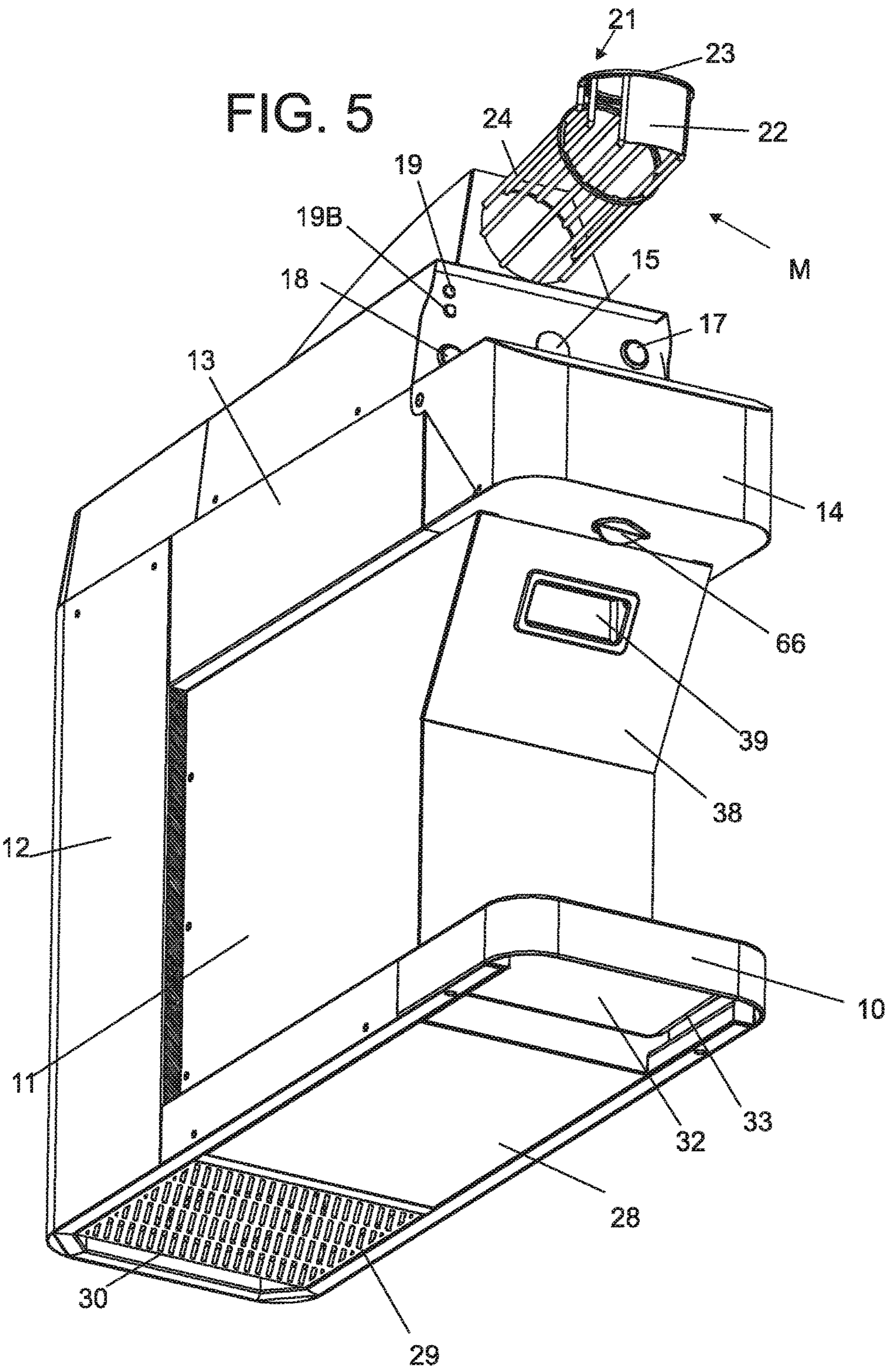
FIG. 5: Bottom front perspective view of the machine.

In a preferred and compact construction, the machine (M) presents a flat and level support base (9) that is rectangular in the version presented here, whose bottom front part holds a drip tray (10), as well as flat vertical side-cowlings (11), rear vertical cowlings (12), top cowlings (13) that form a top front surface (14) holding the operating buttons or displays, one of which is an emergency button (15), a general switch (16), an on-switch (17), an off-switch (18), and LED indicator lights (19) for peels (19B) and open (FIGS. 1, 2 and 5).

Just above the surface (14) is a cowling (20) with a fruit funnel (21), fitted at the front with a sizer element (22) that controls the maximum and minimum sizes for fruit entering such funnel (21), consisting of a wire element that communicates with the feeder/dispenser (5) in the machine, with this funnel having an inflow rim (23) and a cylindrical wire conduit (24) projecting into the machine at a slight slant that is sufficient to allow the fruit to move forward through gravity. The electro-electronic part of the machine is a commonplace solution not addressed by this protection, with the components listed for clarification purposes and allowing a person skilled in the matter to reproduce the product, with a market solution (FIGS. 1, 2, 3, 6, 18, 19, 20 and 21).

The rear part of the top cowling (20) has a linking mechanism (25) that moves it into the open or closed position, as the inside consists of a metal structure made from rectangular sheeting sections (26) on the sides that are supported on the bottom metal frame (27) of the support base (9), with the latter holding the sheet metal sections (28), with the rear sections (29) being pierced (30) in order to provide a means of ventilation for the gear-motor sub-set (31) that powers the mobile peeler (2) and fruit-rack (1), while the front section is a solid metal sheet (32) with curved edges (33) attached to the sheet metal structure (26), such solid metal sheet (32) topped by a thin metal sheet with front slots (34), above which are the pivot points (35) of the swing-lidded waste-bin (7) whose sides are approximately semicircular (8), with such waste-bin having a flange projecting from its transversal rim (36) with a spring-pin locking device (37) that keeps it latched in the closed position, while the front metal sheet (38) is fitted with a handle (39) made from plastic or some similar material (FIGS. 4, 5, 6, 18, 19 and 23).

The front metal sheet (38) has a convex (inverted slant) surface whereby when the swing-lidded waste-bin (7) is in the open position, it forms a sloping surface (40) that allows easier waste removal and cleaning (FIGS. 10, 17, 18 and 19).

In the rear part of the machine is the gear-motor sub-set (31), which is in turn attached to the sheet metal sections base affixed to the structure (27) of the metal base (9) and the rectangular metal sheet sections structure (26), being held thereto by screws or other conventional means of attachment (FIGS. 6 and 7).

Projecting from the top end of the gear-motor sub-set (31) is a crank arm (41) whose pivoting end (42) is connected to an axle (43) with a pulley (45) that in turn runs through a guide (44) across the machine, with such guide (44) having grooves at the opposite ends to hold he opposing cylindrical axles (46) running through the metal sheet side guides (47) and with the guide (44) supported on the front edges (47B) of the structural part of the machine, with such metal sheet side guides (47) having rectangular dips (48) where the spiral springs work (49) with plastic stoppers (50), whose extended linear movements are limited by the rectangular dips (48), thus defining the maximum movement of the above-mentioned plastic stoppers (50), through converting the rotating movement of the crank arm (41) into the linear movement of the guide (44). The opposing parallel axles (51) of the mobile peeler (2) are attached to the guide (44), with such opposing parallel axles (51) being fully attached to the guide (44) and running through the structure of the machine on bushings (52) incorporated into the structural metal sheet (53), and with such opposing parallel axles (51) extending to the opposite sides of the mobile peeler (2), where they are attached to the diamond-shaped base (53B) in order to endow the latter with alternating linear to-and-fro movements (FIGS. 8, 9, 18 and 19).

This substantially diamond-shaped base (53B) has opposing vertices along the length of the diamond with holes (54) through which the above-mentioned axles run (51); with such base providing the vertical housings (55) that hold the slots (3) of the fruit-rack sub-set (1), with the latter comprising a base/support (56) with a concave curve (57) whose radius is larger than that of the fruit (F) that it will hold, with substantially "C"-shaped arms (58) projecting on both opposite sides from the rear part of such fruit-rack, with internal reinforcement elements (59) whose tips are fitted with substantially "U"-shaped supports that hold axles with pulleys (60) activating the spiral cross-spring (4) that releases or holds the fruit (F) during the operating stages of the machine (M) (FIGS. 11, 12, 13, 14 and 15).

Figure 11:
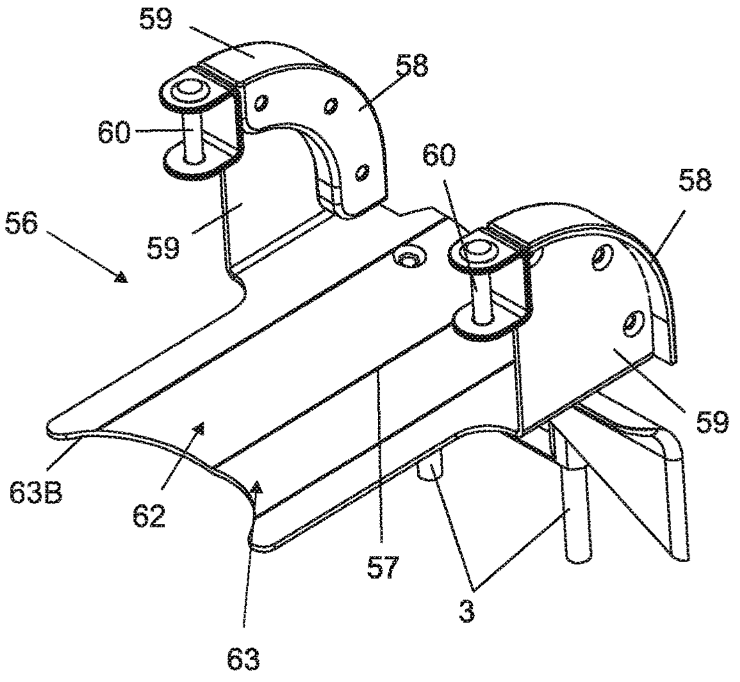
FIG. 11: Perspective view of the fruit-rack.
Figure 12:
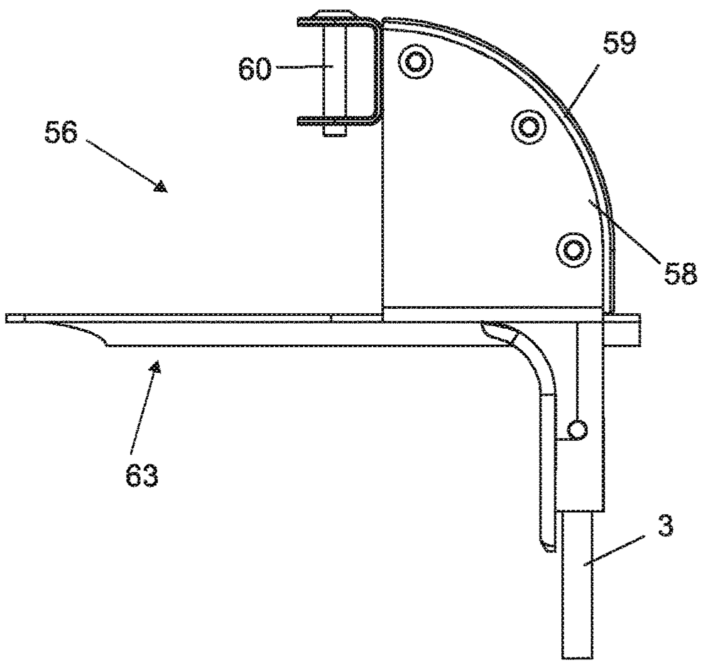
FIG. 12: Side view of the fruit-rack.
Figure 13:
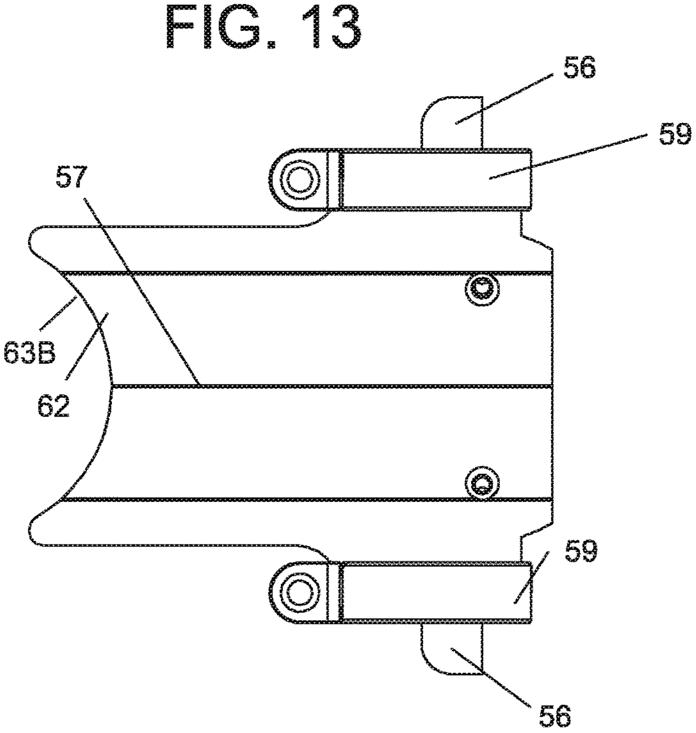
FIG. 13: Top view of the fruit-rack.
Figure 14:
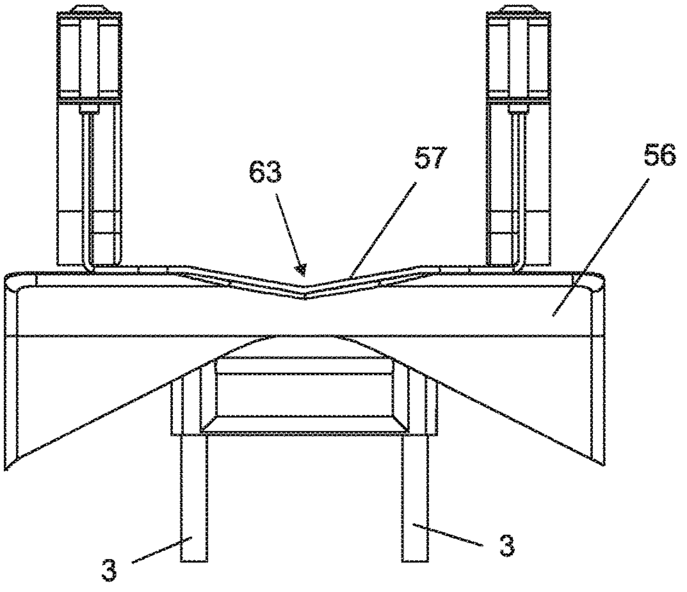
FIG. 14: Front view of the fruit-rack.
Figure 15:
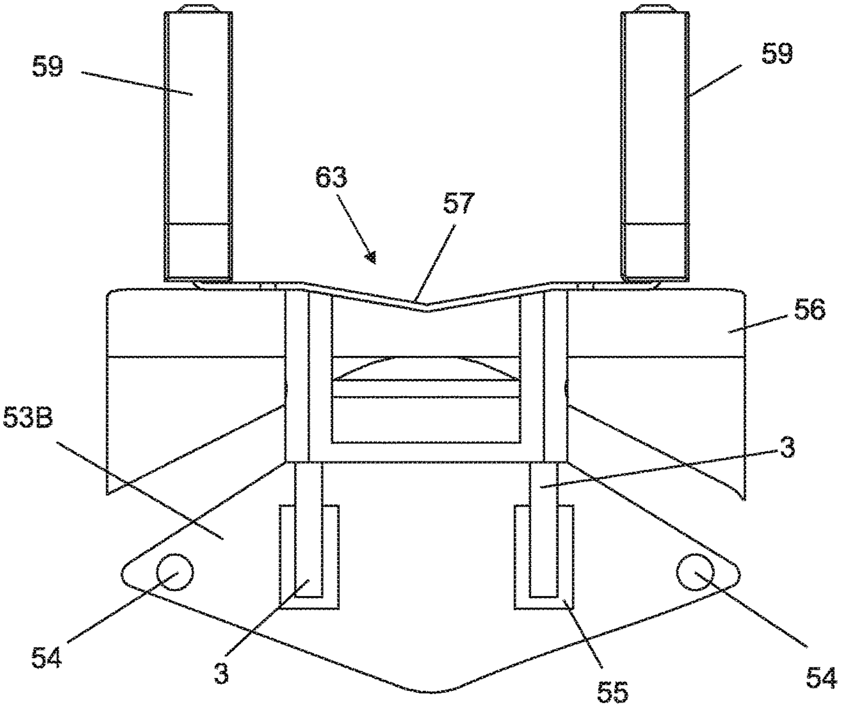
FIG. 15: Rear view of the fruit-rack.
Figure 16:
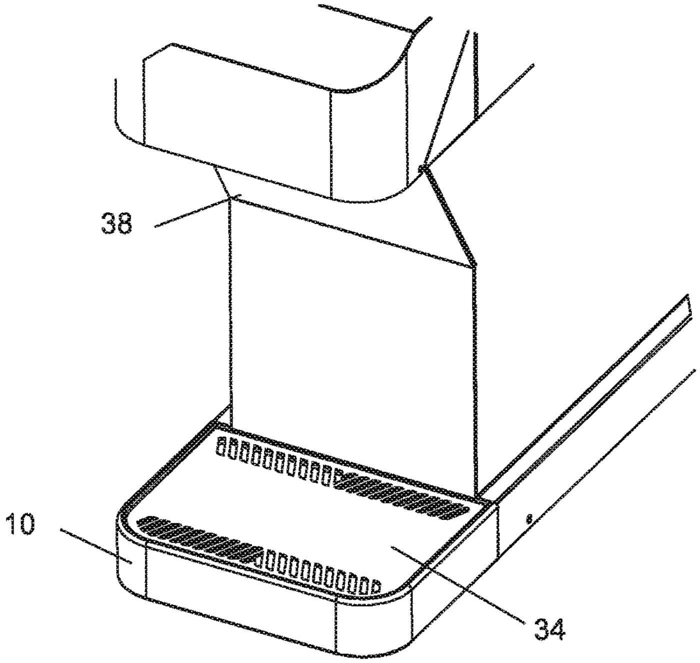
FIG. 16: Perspective view of the swing-lidded waste-bin separated from the machine, in the closed use position.
Figure 17:
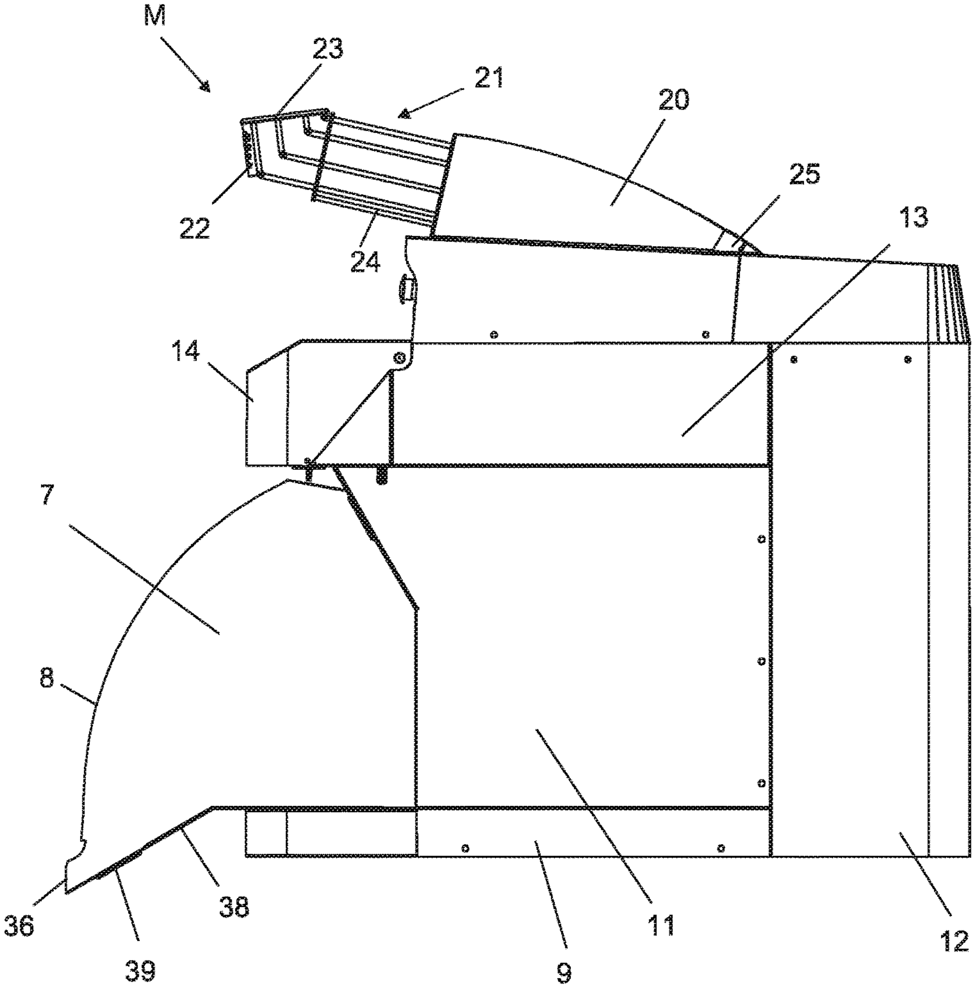
FIG. 17: Side view of the swing-lidded waste-bin separated from the machine, in the open use position.
Figure 20:
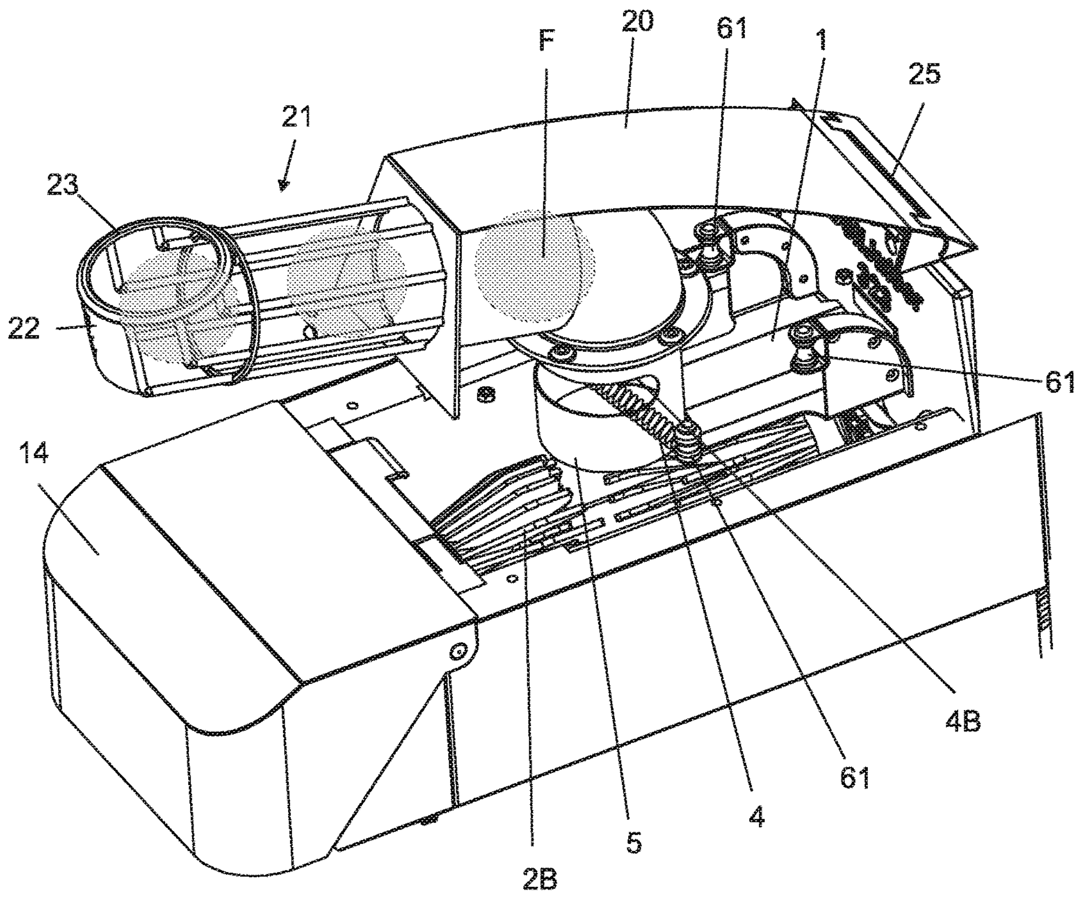
FIG. 20: Partial top side cross-section view of the machine with the upper cowling closed and the mobile peeler in the first stage starting position.
Figure 21:
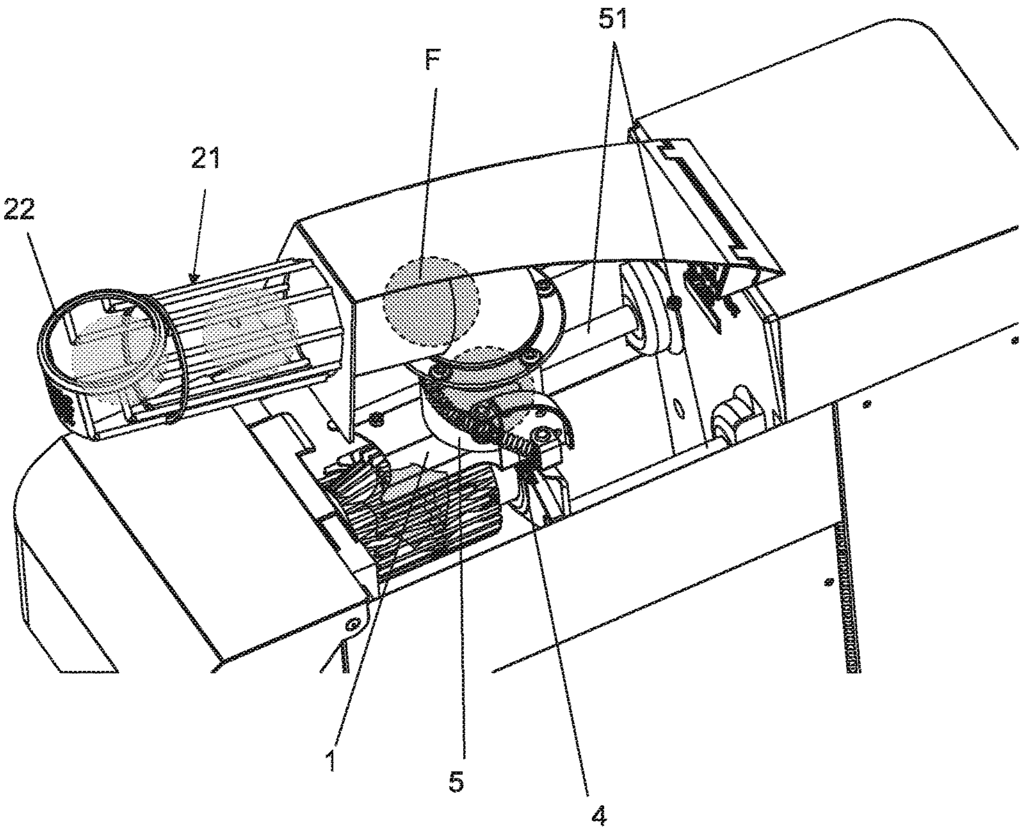
FIG. 21: Partial top side cross-section view of the machine with the upper cowling closed and the mobile peeler in the third stage, removing the peel from the fruit and almost simultaneously extracting its juice.
Figure 22:
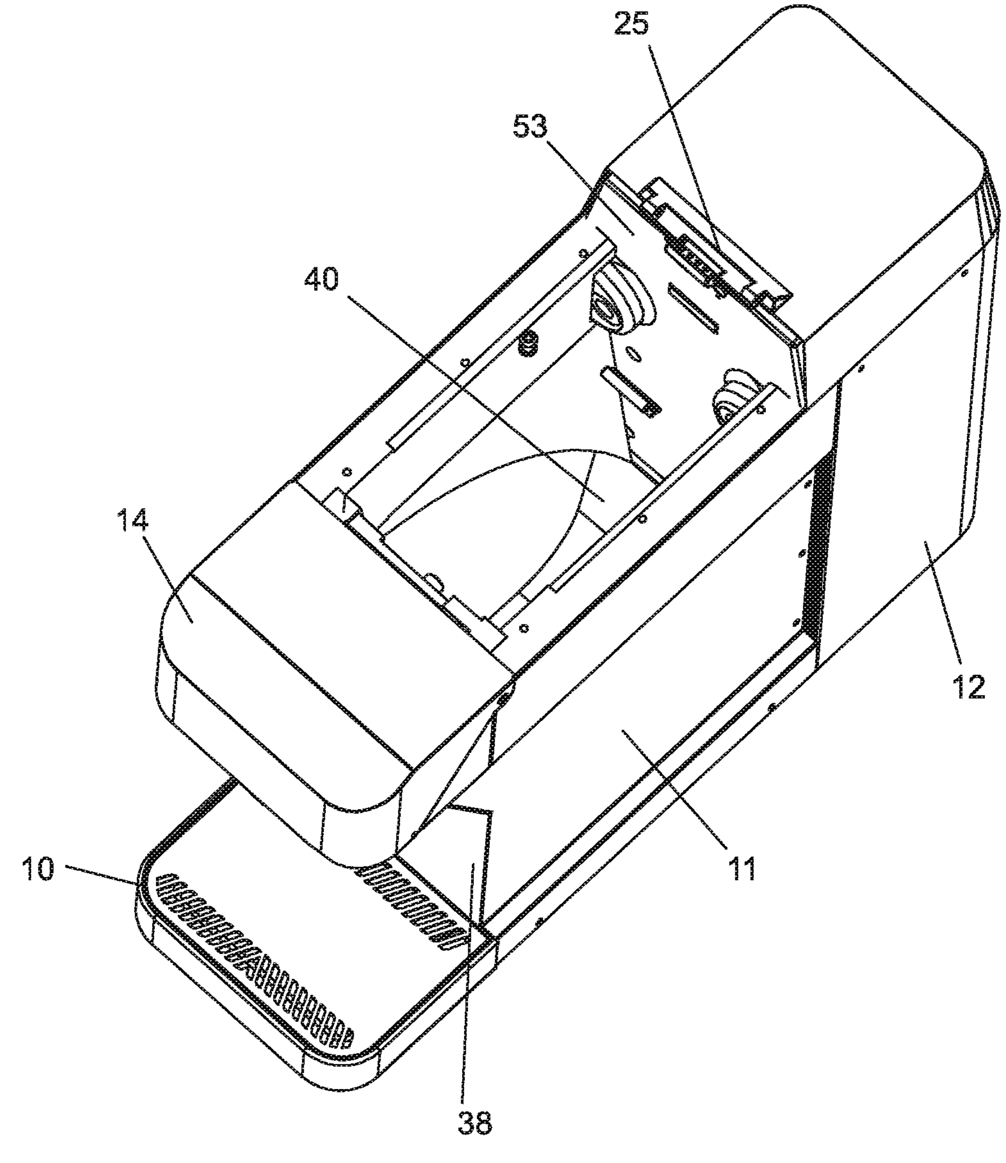
FIG. 22: Top front perspective view of the structural cowling and hinges of the machine.
Figure 23:
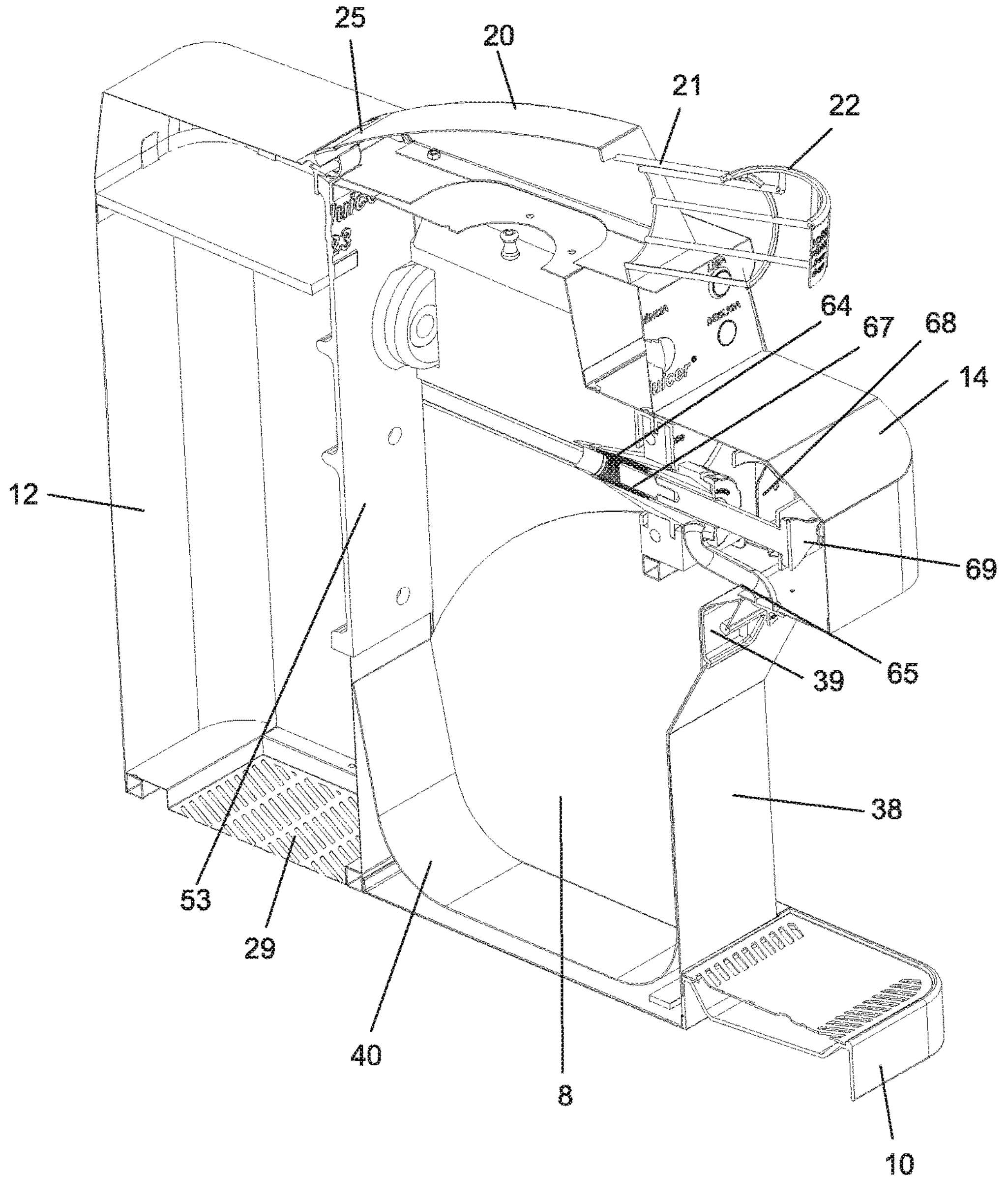
FIG. 23: Rear perspective view of the structural cowling and hinges of the machine, with details of the filter and piston sub-set and a cross-section view of the swing-lidded waste-bin.

When moved in a linear direction, the substantially "C"-shaped arms (58) with the pulleys (60), alongside the mobile peeler sub-set (2) reach the cross-spring (4) that runs through the axial cross-section (4B) of the feeder/dispenser (5), with such cross-spring (4) supported by the parallel pulleys (61) attached to the sides of the machine casing, releasing the fruit (F) that drops by gravity on to the cradle base/support (56); such cradle base/support (56) consists of a smooth surface (62) with an elongated cross-section whose center (63) is lowered slightly into a "V"-shape that forms a curve (57) preventing damage to the fruit (F) and allowing it to slip down easily; on the top part of the smooth surface (62) is a rounded cut-out (63B) whose linear movement either holds the fruit back or releases it into the next stage (FIGS. 11, 20 and 21).

Figure 19:
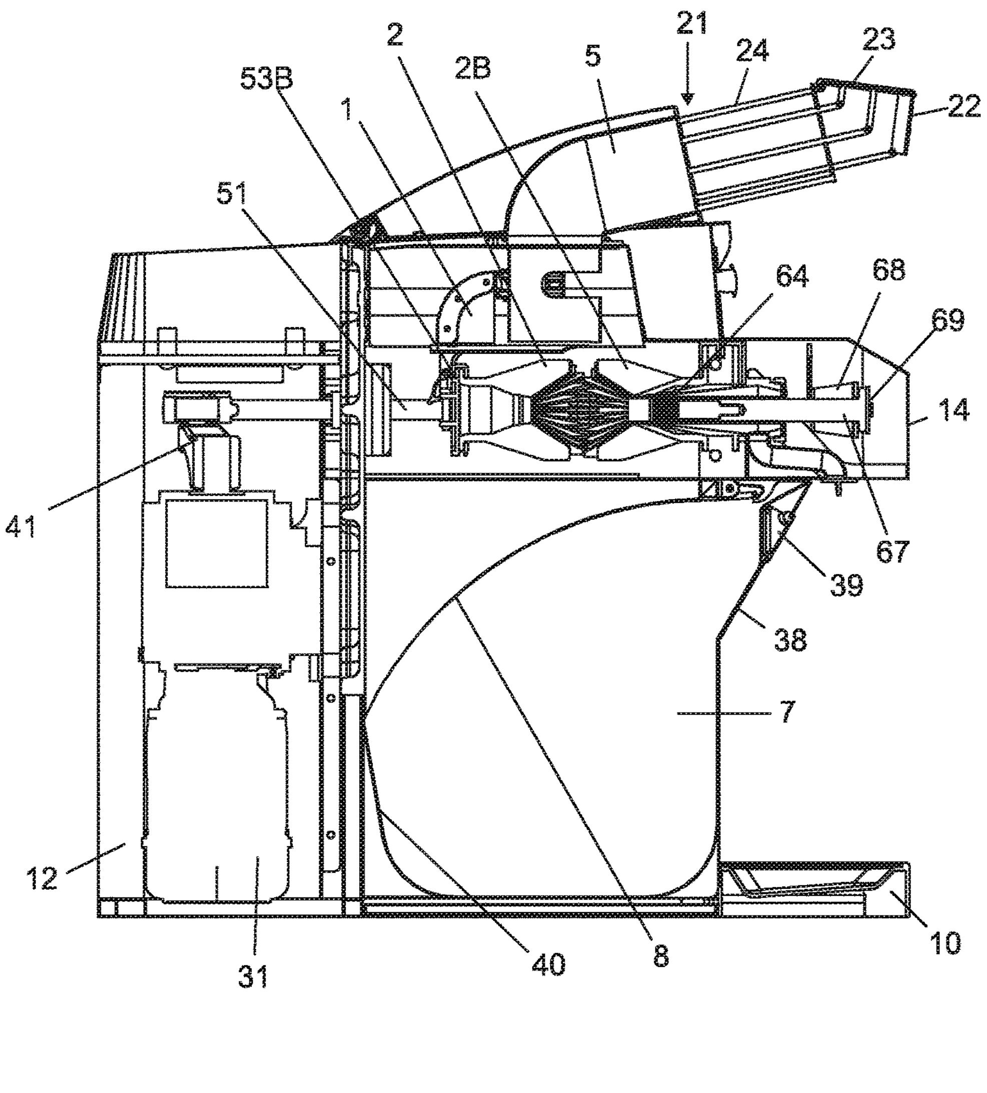
FIG. 19: Front view of the machine with partial cross-sections near the dispenser/feeder sub-set, fruit-rack and swing-lidded waste-bin in the closed position.

The filter (64) mounted on the front part of the machine (M) communicates with the inner part of the fixed peeler (2B) and the "S"-shaped pipe (65) in order to release liquid through the activation device (66). The filter and piston sub-set (67) is attached to the machine (M) by a cross-blade (68) affixed to the axles (46) by conventional means and with a front lid (69) that may be removed when necessary (FIGS. 6, 18 and 19).

According to the invention, with this new machine (M) the fruit (F) runs through three stages, all synchronized by the movement of the mobile peeler (2). In the first stage, the fruit (F) lies on a cross-spring (4) in the feeder/dispenser (5); in the second stage, the fruit (F) falls on to the fruit-rack (1) through the contact action in the activation device releasing the cross-spring (4) during the linear movement of the mobile peeler (2) towards the fixed peeler (2B), being kept above the mobile peeler (2) by the action of the cross-spring (4); in the third stage, the fruit (F) falls between the fixed (2B) and mobile peelers (2) that extract the juice. With each new cycle and with the feeder/dispenser (5) full, one fruit (F) drops at each stage.

Most of the components used in the construction of the machine (M) are metal, using stainless steels almost exclusively and conventional manufacturing means such as welds and screws, among others. The other non-metal components are normally food-grade polymers, with the means of processing being analogously compatible with market technologies.

The invention claimed is:

1. A juice extraction machine comprising first and second peeler cups for extracting juice from a fruit item and a fruit dispenser for delivering the fruit item to the peeler cups, comprising:

a fruit rack disposed between the fruit dispenser and the peeler cups, the fruit-rack including a top surface for receiving the fruit item from the fruit dispenser, a portion of the fruit-rack top surface including an edge over which the fruit item is releasable from the top surface to fall toward the peeler cups, wherein:

the second peeler cup is moveable, with respect to the first peeler cup, to undergo linear displacements in two opposite directions, the fruit-rack is coupled to undergo movement synchronized with movement of the second peeler cup, and at least one peeler cup is positioned directly beneath the rack during at least a portion of the synchronized movement.

2. The juice extraction machine of claim 1, wherein the top surface is concave and comprises a smooth V-shaped surface portion and the edge comprises a rounded cut-out.

3. The juice extraction machine of claim 1 wherein:

the fruit rack and the second peeler cup are mechanically coupled with one another to effect synchronized movements and the fruit dispenser comprises a spring operable to occupy first position to hold the fruit item within the fruit dispenser and moveable to a second position to release the fruit item from the fruit dispenser, causing the fruit item to fall toward the peeler cups, and the fruit rack further comprises an arm extendable to make contact with the spring and thereby move the spring between the first and second positions in synchrony with movement of the second peeler cup.

4. A juice extraction machine comprising a pair of peeler cups operable to receive a fruit from a fruit dispenser, to peel the fruit, to extract juice from the fruit, and to expel waste, the juice extraction machine further comprising an enclosure at least partially surrounding the peeler cups, the enclosure comprising:

a fruit rack disposed above the peeler cups, a top surface of the fruit rack comprising a concave shape for receiving the fruit from the fruit dispenser, and an edge of the fruit rack comprising a cut-out for releasing the fruit from the top surface into the peeler cups; and a waste bin disposed below the peeler cups, the waste bin comprising opposed sides rotatable about a pivot from a closed position during juice extraction to an open position for removal of the waste from the waste bin.

5. The juice extraction machine of claim 4, wherein each side of the waste bin is substantially semi-circular.

6. The juice extraction machine of claim 4, wherein a front surface of the waste bin comprises a convex shape defining a sloping surface when the waste bin is in the open position.

7. The juice extraction machine of claim 4, wherein the top surface of the fruit rack comprises a V-shape.

8. The juice extraction machine of claim 4, wherein the fruit rack is attached to a mobile one of the peeler cups.

9. The juice extraction machine of claim 8, wherein:

the fruit dispenser comprises a spring operable in a first position to hold the fruit within the fruit dispenser and moveable to a second position to release the fruit onto the fruit rack; and the fruit rack further comprises an element configured to interface with the spring to move the spring between the first and second positions responsive to movement of the mobile one of the peeler cups.

10. The juice extraction machine of claim 9, wherein the element configured to interface with the spring comprises a C-shaped arm projecting from each respective opposed side of the fruit rack.

11. A method of extracting juice from a plurality of fruit items in the juice extraction machine of claim 1, the method comprising:

energizing relative reciprocal movement of the second peeler cup;

sequentially loading each of the fruit items into the fruit dispenser;

sequentially releasing each of the fruit items from the fruit dispenser on to the fruit rack when the peeler cups are in a closed juice extraction position; and sequentially dropping each of the fruit items from the fruit dispenser into the peeler cups when the peeler cups are in an open position, where the foregoing steps of loading, releasing and dropping are simultaneously and repetitively performed in synchrony.

12. A method of extracting juice from multiple fruit items in the juice extraction machine of claim 4, the method comprising:

energizing relative reciprocal movement of the second peeler cup;

sequentially loading each of the fruit items into the fruit dispenser;

sequentially releasing each of the fruit items from the fruit dispenser on to the fruit rack when the peeler cups are in a closed juice extraction position; and sequentially dropping each of the fruit items from the fruit dispenser into the peeler cups when the peeler cups are in an open position, where the steps of loading, releasing and dropping are cyclically repeated.

13. A juice extraction machine comprising:

an enclosure;

first and second peeler cups positioned so that the enclosure at least partially surrounds the peeler cups, the peeler cups operable to collectively receive a fruit item to peel the fruit item, to extract juice from the fruit item, and to expel waste, the second peeler cup being controllable to impart linear movement of the second peeler cup with respect to the first peeler cup and the enclosure; and a fruit-rack comprising an upper surface to receive the fruit item; and a release device positioned to come into contact with the fruit item while the fruit item is on the fruit-rack upper surface, the fruit rack positioned above the peeler cups, the upper surface including an edge from which the fruit item can be dropped to the peeler cups, and where the fruit-rack upper surface is coupled to undergo movement synchronized with movement of the second peeler cup, said synchronized movement allowing the fruit-rack to be extended to a position between the release device and the peeler cups.

14. The machine of claim 13 further including a fruit feeder positioned to provide multiple fruit items to the fruit-rack, the fruit feeder including a bottom portion extending toward the fruit-rack, said machine configured to provide three stages of operation to sequentially process the multiple fruit items, each stage synchronized with movement of the second peeler cup, where:

in the first stage a first of the fruit items comes into contact with a release device while in the bottom portion of the fruit feeder;

in the second stage, the first fruit item falls from the fruit feeder on to the fruit-rack upper surface through action of the release device during the linear movement of the second peeler cup toward the first peeler cup; and in the third stage, the first fruit item falls between the first and second peeler cups in order to extract the juice.

15. The machine of claim 14 where the machine performs the stages in repetitive cycles of operation on the multiple fruit items where multiple fruit items are each contemporaneously undergoing a different stage of operation.

16. The machine of claim 14 where the release device is a spring device extending across an opening in the fruit feeder through which fruit items pass one at a time as the spring device is selectively displaced.

17. The machine of claim 13, further including:

a fruit feeder positioned to provide the fruit item to the fruit rack; and a displaceable spring device coupled to the fruit rack to effect dropping of an additional fruit item received by the fruit-rack from the fruit feeder during a movement of the spring device synchronized with movement of the fruit-rack upper surface.

18. The machine of claim 13 further including a waste bin disposed below the first and second peeler cups, the waste bin comprising opposed sides rotatable about a pivot from a closed position during juice extraction to an open position for removal of the waste from the waste bin.

19. The juice extraction machine of claim 1, the fruit-rack positioned for delivering the fruit item to the peeler cups, the machine further including a release device extending above the fruit rack top surface and positioned to come into contact with the fruit item while the fruit item is on the fruit-rack upper surface.

20. The juice extraction machine of claim 19 where the release device is a spring.

21. A juice extraction machine comprising first and second peeler cups for extracting juice from a fruit item and a fruit dispenser for delivering the fruit item to the peeler cups, comprising:

a fruit rack disposed between the fruit dispenser and the peeler cups, the fruit-rack including a top surface for receiving the fruit item from the fruit dispenser, a portion of the fruit-rack top surface including an edge over which the fruit item is releasable from the top surface to fall toward the peeler cups wherein, when the juice extraction machine is positioned along a horizontal plane:

the second peeler cup is moveable, with respect to the first peeler cup, to undergo linear displacements in two opposite horizontal directions, and the fruit-rack is coupled to undergo horizontal movement synchronized with movement of the second peeler cup.

22. The juice extraction machine of claim 1 where synchronized movement of the second peeler cup is a cyclic movement and the second peeler cup is positioned directly beneath the rack during the entirety of each cyclic movement.

* * * * *